March 4, 1969    W. H. CLENDENIN    3,430,757
COMBINATION ELEVATOR
Filed Oct. 2, 1967
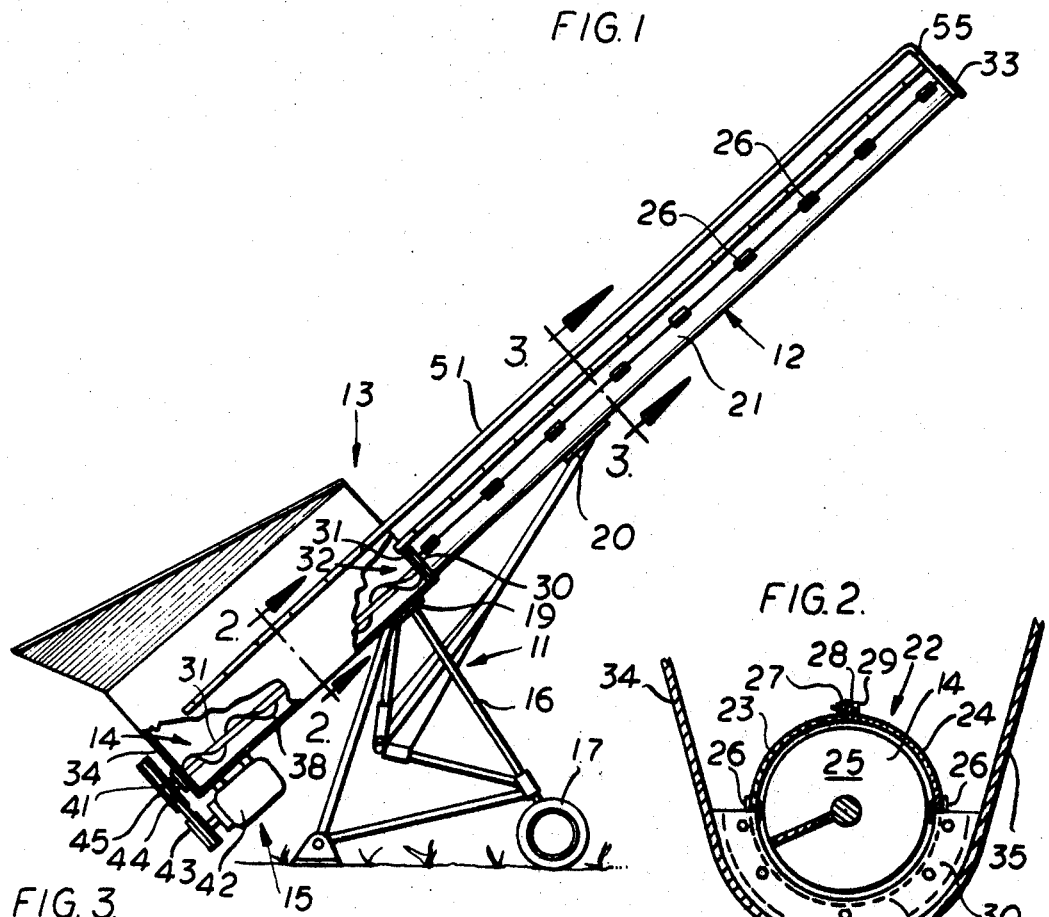
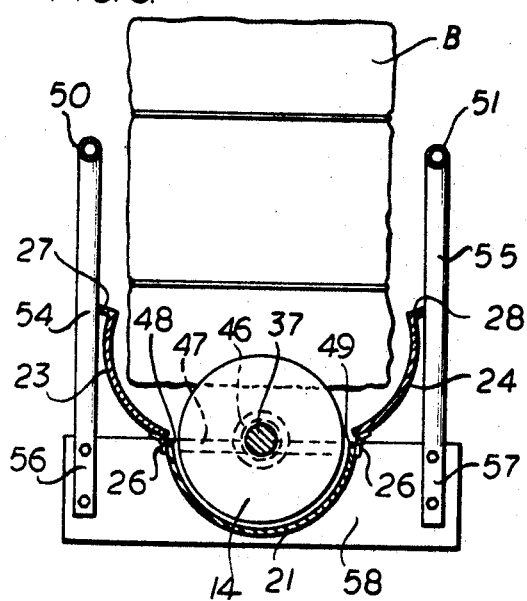
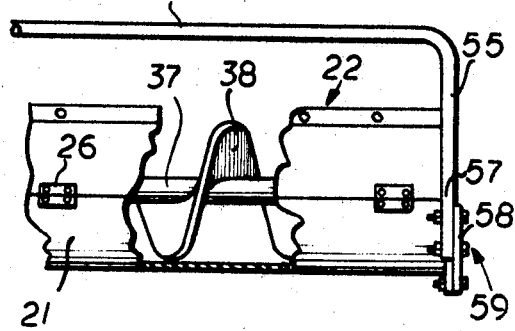
INVENTOR
WILBUR H. CLENDENIN
ATTY

United States Patent Office 3,430,757
Patented Mar. 4, 1969

1

3,430,757
COMBINATION ELEVATOR
Wilbur H. Clendenin, Ava, Ill., assignor to International Harvester Company, Chicago, Ill., a corporation of Delaware
Filed Oct. 2, 1967, Ser. No. 672,210
U.S. Cl. 198—213       8 Claims
Int. Cl. B65g 33/14

ABSTRACT OF THE DISCLOSURE

A combination elevator for selectively handling granular material and bundled material. The elevator includes a trough covered by a pair of swingable cover members. The cover members occupy a closed position which in combination with the trough constitutes the auger housing, and are swingable outwardly to an open position exposing a peripheral portion of the auger, the exposed auger adapted to engage and lift bales of hay deposited thereon.

Background and summary of the invention

This invention relates generally to elevators and more specifically to a combination grain elevator and bale lift.

Heretofore, the type of elevator most commonly used for handling a variety of crops ranging from grain to bales of hay has been the belt conveyor equipped with transverse flights. The flighed belt, orbiting in an open trough, is ideally suited for handling a variety of materials placed in the trough, the only restriction being the lateral dimension of the trough. Auger conveyors, on the other hand, since they ware designed to rotate in a closely fitting housing, e.g., the common grain elevator, or rotate in an open trough, e.g., the typical auger bunk feeder, were not capable of selectively handling both granular material and baled material.

The purpose of the present invention is to provide an auger conveyor capable of handling granular material and baled material. An auger conveyor possessing such versatility offers savings in equipment cost—one conveyor replaces two separate machines formerly required. The versatility contemplated by this invention is achieved by providing an auger housing which in one position accommodates granular material and in another position accommodates bales of hay.

The objects of the present invention briefly are: to provide a versatile auger conveyor; to provide an auger conveyor capable of selectively handling granular material and baled material; to provide a portable elevator capable of handling a variety of materials. These and other objects will become apparent to those skilled in the art from the following disclosure taken in conjunction with the attached drawings.

Drawings

FIGURE 1 is a side elevational view of the auger conveyor contemplated by the present invention, shown in the grain elevating service;

FIGURE 2 is a sectional view taken generally along line 2—2 of FIGURE 1;

FIGURE 3 is a sectional view taken generally along line 3—3 of FIGURE 1 showing the auger conveyor in bale elevating service; and FIGURE 4 is an enlarged fragmentary view of the discharge end of the auger conveyor shown in FIGURE 1.

Description of the preferred embodiment

Referring to FIGURE 1, an elevator 10 constructed in accordance with the principles of the present invention is seen to comprise generally a wheel mounted chassis 11, an auger tube 12 portably carried by the chassis 11, a hopper 13 disposed at one end of the tube 12, and auger 14 extending through the auger tube 12 and the hopper 13, and drive means 15 for powering the auger 13.

The chassis 11 is conventional having a tubular frame structure 16, a pair of spaced wheels 17 (one wheel only shown) and a ground engaging shoe 18. Since the chassis 11 per se forms no part of this invention, its description has been in general terms to merely indicate the portable nature of the elevator contemplated.

The hopper 13 and auger tube 12 are bolted together by means to be discussed presently forming a rigid assembly which is supported by the chassis at longitudinally spaced points 19 and 20.

As illustrated in FIGURES 2 and 3, the tube 12 is formed in two relatively movable parts, referred to as a trough 21 and a cover 22. The trough 21, in the form of a semicylinder, houses the lower half of auger 14. The cover 22 consists of a pair of longitudinal members 23, 24 which together form a downwardly facing semicylinder. The cover members 23, 24 in the closed position of FIGURE 2, in combination with the trough 21, define an interior circular passage 25. The cover members 23 and 24 are respectively hinged to opposite sides of the trough 21 by a plurality of longitudinally spaced hinges 26 and are adapted to swing outwardly therefrom exposing the auger 14. Each of the cover members 23, 24 are provided with flanges 27 and 28, respectively, which are arranged to abut one another with the covers in the closed position (FIGURE 2). The closed position is maintained by a plurality of nut and bolt assemblies 29 arranged to clamp flanges 27 and 28 securely together at longitudinal intervals.

Considering FIGURES 1 and 2 together, it will be seen that the lower end of tube 12 is bolted to hopper 13, the passage 25 of tube 12 being in communication with the interior of hopper 13. The junction is provided by a flange 30 formed in trough 21 bolted to a front wall 31 of hopper 13. Thus the passage has an inlet 32 opening into hopper 13 and an outlet 33 represented by the upper opened end of tube 12.

The hopper 13 is a conventional gravity feed hopper common to many types of elevators and conveyors, having converging side walls 34 and 35 integrally formed with a circular bottom section 36. The rear of the hopper 13 is closed by a wall 34. Except for the front wall 31 which extends upwardly from the circular portion 33 to the extent of trough 21, the front of the hopper 13 is open.

The auger 14 comprises a drive shaft 37 which supports the helicoid flighting 38. The auger 14 extends from the discharge 33, through the passage 25, through the inlet 32, through the hopper 13, terminating at wall 34. The shaft 37 is journalled to wall 34 by bearing 41 and projects a short distance beyond hopper 13. This projection provides the means for connecting the auger 14 to a power source which, in this embodiment, includes an electric motor 42 drivingly connected to the shaft 37 through a motor pulley 43, V-belt 44 and drive pulley 45.

In order to maintain the alignment of bales handled by the elevator, two forms of guide means are shown. A pair of laterally spaced tubular guide rails 50, 51 bolted to the interior of hopper walls 34 and 35 extend forwardly therefrom parallel to the longitudinal axis of auger 14.

The guide rails 50 and 51, respectively, include downturned sections 54 and 55 which terminate at ends 56 and 57. Ends 56 and 57 are bolted to a support plate 58 which in turn is flangedly connected to the trough 21 as shown generally at 59 in FIGURE 4. The support plate 58 is shaped with a semi-circular opening conforming to the passage 25. The downturned sections 54 and 55 are positioned in the path of the swinging cover members 23 and 24 in order to limit the extent at which these members swing, as illustrated in FIGURE 3. As the cover members 23 and 24 are swung to their open position (FIGURE 3), the upper edges of flanges 27 and 28, respectively, abut the downturned sections 54 and 55. In this position the inner edges of the flanges 27 and 28 are laterally spaced to provide a guide channel for a bale B accommodated on auger 14. The guide rails 50 and 51 are arranged to confront an upper section of the sides of bale B–1 to provide additional guidance for the bale. However, it should be understood that the cover members 23 and 24, provided with any suitable stop means, alone could serve as the bale guide means.

The operation of the elevator 10 will be described first in the grain conveying service and then in the bale lifting service. In the grain conveying service the cover members 23 and 24 are swung to the closed position as shown in FIGURE 2 and clamped together by bolt assemblies 29. Grain is fed into the gravity hopper 13 where it is picked up by auger 14, fed into tube inlet 32, conveyed through passage 25, and discharged at end 33.

To convert the elevator to bale lifting service, the bolt assemblies 29 are removed and the cover members 23 and 24 are pivoted outwardly about their respective hinged points 26 to the open position of FIGURE 3 wherein the flanges 27 and 28, respectively, abut stops 54 and 55. In this arrangement, bale B is hand placed on the auger 14 between the open cover members 23 and 24. The upper peripheral portion of the rotating flight 38 penetrates the bale B, forcing it upwardly through the channel defined by the open cover members 23 and 24. The cover members 23 and 24, in cooperation with the guide arms 50 and 51, maintain alignment of the bale B until it is discharged through open end 33.

It should be understood that the detail description of this preferred embodiment is by way of illustration only, and that numerous modifications may be made therein without departing from the spirit and scope of the present invention as set forth in the appended claims.

What is claimed is:
1. An apparatus for selectively conveying granular material and bundled material, said apparatus comprising:
   a trough having a receiving end and a discharge end;
   a cover cooperatively arranged with said trough forming an enclosed passage between said receiving end and said discharge end;
   an auger rotatively mounted in said passage for conveying material from said receiving end to said discharge end, said cover being movable to an open position exposing a peripheral portion of said auger, said exposed portion being adapted to engage and convey bundled material from said receiving end to said discharge end; and means for driving said auger.

2. The apparatus as recited in claim 1 and further comprising:
   a pair of guide rails mounted on opposite sides of said trough and extending substantially the entire length thereof, said guide rails being laterally spaced to receive and maintain alignment of bundled material conveyed by said auger.

3. The apparatus as recited in claim 2 and further comprising a transport attached to said trough, said transport including means for varying the elevation of said receiving end and said discharge end.

4. The apparatus as recited in claim 3 and further comprising:
   a hopper surrounding said receiving end, said hopper having a top opening for receiving material, and a front opening to permit passage of bundled material.

5. The apparatus as recited in claim 1 wherein said cover comprises:
   a pair of longitudinal members of arcuate cross section, said members and said trough defining said passage, each of said members having a longitudinal edge hinged to a longitudinal section of said trough at points situated below said peripheral portion of said auger and a movable, longitudinal edge abuttable with a corresponding edge of the other of said members, and said members being swingable upwardly and outwardly about their respective hinged edge to an open position wherein said movable edge of each is outside the lateral extent of said trough.

6. The apparatus as recited in claim 5 and further comprising:
   means for limiting the extent of swingability of said members to an open position conforming to the lateral dimension of bundled material conveyed, the movable edges of said members in said open position serving as lateral guides for the bundled material between said receiving end and said discharge end.

7. The apparatus as recited in claim 6 and further comprising a pair of guide rails flanking said trough and laterally spaced to receive and maintain alignment of bundled material conveyed on said auger, each of said guide rails corresponding to one of said members, and including a portion for limiting the outward swingability of said one of said members, each of said guide rails being in general vertical alignment with the movable edge of its corresponding member with said member in said open position.

8. An elevator comprising:
   a transport;
   an elongate tube mounted on said transport and having an inlet and an outlet, said tube including
   a longitudinal trough portion constituting the lower sectional half of said tube,
   a cover portion hinged to said trough portion and constituting the upper sectional half of said tube,
   a hopper enclosing said tube inlet;
   an auger extending through said tube and said hopper, said cover portion being swingable to an open position wherein said auger has an upper peripheral portion disposed for engagement with bundled material placed thereon,
   a pair of guide rails flanking said tube and laterally spaced for receiving and guiding bundled material conveyed on said auger; and
   means for driving said auger.

References Cited

FOREIGN PATENTS 1,038,916  10/1953  France.

EDWARD A. SROKA, Primary Examiner.

U.S. Cl. X.R.

198—204